US012415974B2

(12) United States Patent
Watson

(10) Patent No.: US 12,415,974 B2
(45) Date of Patent: Sep. 16, 2025

(54) UNIT-DOSE CONCENTRATED HIGH PERFORMANCE MULTIPURPOSE CLEANING COMPOSITIONS COMPRISING AN ANTIMICROBIAL/DISINFECTANT MIXTURE

(71) Applicant: Korex Canada Company, Etobicoke (CA)

(72) Inventor: Douglas Robert Watson, Toronto (CA)

(73) Assignee: Korex Canada Company, Ontario (CA)

( * ) Notice: Subject to any disclaimer, the term of this patent is extended or adjusted under 35 U.S.C. 154(b) by 175 days.

(21) Appl. No.: 17/194,376

(22) Filed: Mar. 8, 2021

(65) Prior Publication Data

US 2021/0277338 A1 Sep. 9, 2021

Related U.S. Application Data

(60) Provisional application No. 62/986,880, filed on Mar. 9, 2020.

(51) Int. Cl.

| | |
|---|---|
| ***C11D 3/48*** | (2006.01) |
| ***C11D 1/825*** | (2006.01) |
| ***C11D 1/83*** | (2006.01) |
| ***C11D 3/30*** | (2006.01) |
| ***C11D 3/43*** | (2006.01) |
| ***C11D 17/04*** | (2006.01) |
| *C11D 1/14* | (2006.01) |
| *C11D 1/66* | (2006.01) |
| *C11D 1/72* | (2006.01) |

(52) U.S. Cl.

CPC ............ *C11D 17/043* (2013.01); *C11D 1/825* (2013.01); *C11D 1/83* (2013.01); *C11D 3/30* (2013.01); *C11D 3/43* (2013.01); *C11D 3/48* (2013.01); *C11D 1/146* (2013.01); *C11D 1/662* (2013.01); *C11D 1/721* (2013.01)

(58) Field of Classification Search

CPC .... C11D 1/29; C11D 1/65; C11D 1/62; C11D 1/72; C11D 1/835; C11D 1/86; C11D 3/044; C11D 3/2068; C11D 3/386; C11D 3/43; C11D 3/48; C11D 17/042; C11D 17/043; C11D 2111/12; C11D 2111/14

See application file for complete search history.

(56) References Cited

U.S. PATENT DOCUMENTS

| | | | | | |
|---|---|---|---|---|---|
| 3,696,043 | A | | 10/1972 | Abarge et al. | |
| 3,939,090 | A | | 2/1976 | Zmoda | |
| 4,242,725 | A | | 12/1980 | Douma et al. | |
| 4,481,326 | A | | 11/1984 | Sonenstein | |
| 4,539,145 | A | | 9/1985 | Alvarez et al. | |
| 4,544,693 | A | | 10/1985 | Surgant | |
| 4,692,494 | A | | 9/1987 | Sonenstein | |
| 4,765,916 | A | | 8/1988 | Ogar, Jr. et al. | |
| 4,801,636 | A | | 1/1989 | Smith et al. | |
| 4,806,260 | A | * | 2/1989 | Broze | C11D 1/65 510/304 |
| 4,972,017 | A | | 11/1990 | Smith et al. | |
| 4,973,416 | A | * | 11/1990 | Kennedy | C11D 17/043 510/303 |
| 5,093,031 | A | | 3/1992 | Login et al. | |
| 5,272,191 | A | | 12/1993 | Ibrahim et al. | |
| 2003/0148908 | A1 | * | 8/2003 | Michel | C11D 17/043 510/297 |
| 2003/0213500 | A1 | * | 11/2003 | Mangin | A47L 17/00 134/29 |
| 2004/0142840 | A1 | * | 7/2004 | de Buzzaccarini | C11D 17/043 510/296 |
| 2005/0119151 | A1 | * | 6/2005 | Mayer | C11D 17/0004 510/476 |
| 2005/0187136 | A1 | * | 8/2005 | Pegelow | C11D 3/06 510/510 |
| 2007/0136954 | A1 | * | 6/2007 | Penninger | C11D 3/227 8/115.51 |
| 2017/0175057 | A1 | * | 6/2017 | Depoot | C11D 1/83 |
| 2019/0211289 | A1 | * | 7/2019 | Friedrich | C08J 5/18 |
| 2019/0330574 | A1 | * | 10/2019 | Piorkowski | C08J 5/18 |
| 2020/0199496 | A1 | * | 6/2020 | Piorkowski | C11D 1/83 |
| 2021/0238511 | A1 | * | 8/2021 | Sun | C11D 10/045 |
| 2022/0259522 | A1 | * | 8/2022 | Bernard | C11D 3/3707 |

* cited by examiner

*Primary Examiner* — Charles I Boyer
(74) *Attorney, Agent, or Firm* — Dinsmore & Shohl LLP

(57) ABSTRACT

A unit dose multi-purpose cleaner concentrate product includes from 4 grams to 50 grams in mass of a concentrated cleaning composition encased in a water soluble film. The concentrated cleaning compositions include at least one cleaning solvent and at least one surfactant. The concentrated cleaning composition further includes a disinfecting agent, an antimicrobial agent as a preservative, or both. A total weight percentage of the at least one cleaning solvent and the at least one surfactant, expressed on an anhydrous basis, is at least 50% of the weight of the unit dose multi-purpose cleaner concentrate product. Methods of cleaning surfaces using the unit dose multi-purpose cleaner concentrate product are also disclosed.

13 Claims, No Drawings

UNIT-DOSE CONCENTRATED HIGH PERFORMANCE MULTIPURPOSE CLEANING COMPOSITIONS COMPRISING AN ANTIMICROBIAL/DISINFECTANT MIXTURE

CROSS-REFERENCE TO RELATED APPLICATIONS

This application claims the benefit of priority under 35 U.S.C. § 120 of U.S. Provisional Application No. 62/986,880, entitled "Concentrated Multipurpose Cleaning Compositions in Unit Dose Packets or Pouches," filed Mar. 9, 2020, the entire contents of which are incorporated by reference in this disclosure.

TECHNICAL FIELD

The present disclosure is directed to multi-purpose cleaning compositions, in particular concentrated multi-purpose cleaning compositions in the form a unit dose product.

BACKGROUND

There are currently numerous multi-purpose spray cleaner products on the market. These products are conventionally sold in plastic spray bottles as dilute solutions of solvents, and surfactants in water. The majority of the weight of these existing products is the water and the plastic container (e.g. usually PET plastic). These products do not have a good environmental footprint, as there is a lot of water and plastic consumed and transported for providing a very small amount of cleaning chemicals.

SUMMARY

The present disclosure is directed to multi-purpose cleaner products provided in the form of concentrated multi-purpose cleaning compositions contained in unit dose packets or pouches. Concentration of multi-purpose cleaning composition formulations into packets of water soluble polyvinyl alcohol film can be used as unit dose products, which can be conveniently dropped or inserted into an empty bottle and the bottle filled with water to make the dilute version of the multi-purpose cleaning composition. The unit dose packet or pouch containing the concentrated cleaning composition can be inserted into a standard bottle and diluted with water to create a multi-purpose cleaner solution. The multi-purpose cleaner solution can then be used to clean glass surfaces, ceramics, bathroom tiles, floor laminate, hardwood, vinyl tile, and other common household surfaces. The concentrated multi-purpose cleaning composition of the unit dose packet can have a chemical concentration level of between 25 to 200 times the current products on the market, thus providing a savings in water, plastic, and transportation and also providing a reduction in landfill demand or plastic recycling resources compared to the current products on the market. The concentrated multi-purpose cleaning compositions can be packaged in unit dose formats such that the unit dose item (i.e. a small packet of concentrated liquid encased in polyvinyl alcohol film) could be of a size (between 4 to 20 grams) and geometry to be conveniently inserted into a small-neck bottle (e.g. bottles having necks typically having a 20-25 mm inner diameter) for use in commercially available multi-purpose trigger spray bottles. Alternatively, the unit dose packet could be from 20 grams up to 50 grams in mass for use in larger bottles and neck openings for institutional or industrial use. The unit dose packet of the concentrated multi-purpose cleaning composition can be constructed with a water soluble casing (e.g. polyvinyl alcohol film or other polymer film) that can be rapidly disintegrated into a ready to use dilute solution without any visible particulates, by addition of water and agitation (e.g., shaking the bottle).

In one or more aspects disclosed herein, a unit dose multi-purpose cleaner concentrate product may include from 4 grams to 50 grams in mass of a concentrated cleaning composition encased in a water soluble film. The concentrated cleaning composition includes a cleaning solvent having a molecular weight greater than 61 grams per mole; a surfactant; and a disinfecting agent, an antimicrobial agent, or both. A total weight percentage of the at least one cleaning solvent and the at least one surfactant, expressed on an anhydrous basis, may be at least 50% of the weight of the unit dose multi-purpose cleaner concentrate product. In embodiments, the concentrated cleaning composition does not include a low molecular weight alcohol having a molecular weight less than or equal to 61 grams per mole.

In one or more other aspects disclosed herein, a method of cleaning a surface may include inserting the unit dose multi-purpose cleaner concentrate product into a vessel. The unit dose multi-purpose cleaner concentrate product may comprise from 4 grams to 50 grams in mass of a concentrated cleaning composition encased in a water soluble film. The concentrated cleaning composition may comprise at least one cleaning solvent, at least one surfactant, and an antimicrobial agent. A total weight percentage of the at least one cleaning solvent and the at least one surfactant, expressed on an anhydrous basis, may be at least 50% of the weight of the unit dose multi-purpose cleaner concentrate product. The method may further include adding water to the vessel and mixing the water and the unit dose multi-purpose cleaner concentrate product in the vessel. The mixing may cause the polymer film of the unit dose multi-purpose cleaner concentrate product to dissolve and the concentrated cleaning composition to mix with the water to form a dilute multi-purpose cleaning solution. The method may further include applying the dilute multi-purpose cleaning solution to a surface.

Additional features and advantages of the described embodiments will be set forth in the detailed description which follows, and in part will be readily apparent to those skilled in the art from that description or recognized by practicing the described embodiments, including the detailed description which follows and the claims.

DETAILED DESCRIPTION

The unit dose multi-purpose cleaner concentrate product of the present disclosure may include a unit dose packet or pouch containing a concentrated multi-purpose cleaning composition, which will be referred to throughout this disclosure as the concentrated cleaning composition. The concentrated cleaning compositions may include one or more cleaning solvents, other than low molecular weight alcohols; one or more surfactants; and one or more of a disinfecting agent(s) with germicidal activity when diluted as intended, antimicrobial agents for product preservation of the diluted product, or both. The cleaning solvents may have molecular weights greater than 61 grams per mole and do not include the low molecular weight alcohols (e.g., alcohols with molecular weight less than or equal to 61 grams per mole). The concentrated cleaning compositions disclosed herein may further include one or a plurality of chelants. The concentrated cleaning compositions may include one or a plurality of dispersive polymers. Chelants and/or dispersive polymers can be included in the concentrated cleaning compositions for general soil removal and hardness control. The concentrated cleaning compositions may also further include one or more of the following: (1) some water content in the concentrated version for the purpose of polyvinyl alcohol film stability and packet/pouch integrity on storage; (2) one or a plurality of alkalinity sources, (3) one or a plurality of hydrotropes or solubilizers that may or may not provide additional cleaning benefits; (4) at least one pH control agent; (5) one or a plurality of colorants; (6) a fragrance or fragrance mixture; (7) one or a plurality of enzymes; or combinations of these. Polymeric or other surfactant like surface modification agents can be included in the concentrated cleaning compositions for making the surface to be cleaned more hydrophilic, and to repel soils. A thickening agent can be included in the concentrated cleaning compositions to improve the rheological behavior (i.e. low drainage rate after spraying onto vertical surfaces) of the diluted cleaning solution in use. Thickening agents can also aid in suspending solid particles of functional ingredients within the overall concentrated cleaning compositions.

Formulating a concentrated cleaning composition for including in a unit dose packet or pouch presents several technical challenges. The concentrated versions of the chemicals, which are aimed at replicating commercial products in dilute format, may have a sufficiently low flash point so as to make the product flammable or combustible. Additionally, following dilution of the concentrated cleaning composition, the diluted solution may be susceptible to microbial spoilage due to the fact that polyvinyl alcohol films and other water-soluble polymer films are a nutrient source. This microbial spoilage can be reduced or prevented by increasing the pH of the concentrated cleaning compositions. However, the pH level of the concentrated cleaning compositions needed to make a dilute multipurpose cleaning composition of sufficiently high pH for prevention of microbial growth would make the concentrated cleaning compositions much too alkaline and, hence, quite corrosive in nature. The greater pH may also make the concentrated cleaning compositions incompatible with the encasing polyvinyl alcohol film, due to hydrolysis of the polymer film. This problem can be solved in the present disclosure by incorporating an antimicrobial agent into the concentrated cleaning composition at a sufficiently high enough concentration so that even after being diluted, the concentration of the antimicrobial agent can serve as a preservative that can inhibit microbial growth. Selection of the antimicrobial agent should account for compliance with local and national regulations pertaining to the allowed concentrations of the specific antimicrobials/preservatives in the concentrated cleaning compositions prior to dilution (undiluted product). The concentrated cleaning compositions may include a disinfecting agent in amounts sufficient to provide disinfecting capabilities to a dilute multi-purpose cleaning solution prepared by diluting the concentrated cleaning composition by a dilution factor of from 25 to 200 times.

Cleaning Solvents

The concentrated cleaning compositions of the present disclosure may include one or a plurality of cleaning solvents. In embodiments, a complimentary blend of cleaning solvents can be developed for specific applications by selecting solvents with differing properties, as defined by the Hansen solubility parameters of each cleaning solvent. The Hansen solubility parameters are measures of the cleaning solvent's capacity to interact with solutes through forces of dispersive, polar/dipolar, and hydrogen bonding. The different properties of the cleaning solvents may be selected to address the soils of concern that are expected to be present in the range of applications for which the unit dose multipurpose cleaner concentrate product is intended to be used. For purposes of the present disclosure, water is not considered to be a cleaning solvent.

The cleaning solvents, either low or high VOC or VOC free, may provide cleaning action. The cleaning solvents used in the concentrated cleaning compositions of the present disclosure may include, but are not limited to, glycol ether solvents, glycol solvents, lower boiling point alcohols, natural solvents, or some combination of these, in which the individual components may fall into one of a number of VOC classifications depending upon its molecular weight, structure and vapor pressure. In the glycol ether category, these glycol ethers that may be used as the cleaning solvents may include but are not limited to dipropylene glycol n-propyl ether, dipropylene glycol n-butyl ether, propylene glycol n-butyl ether, propylene glycol n-propyl ether, tripropylene glycol n-butyl ether, propylene glycol phenyl ether, dipropylene glycol phenyl ether, propylene glycol methyl ether, propylene glycol methyl ether acetate, dipropylene glycol methyl ether, dipropylene glycol methyl ether acetate, tripropylene glycol methyl ether, ethylene glycol hexyl ether, diethylene glycol hexyl ether, ethylene glycol propyl ether, diethylene glycol phenyl ether, ethylene glycol phenyl ether, poly (oxy-1,2-ethanediyl), alpha-phenyl-omega-hydroxy, diethylene glycol ethyl ether, diethylene glycol n-butyl ether, ethylene glycol n-butyl ether. The glycol ether solvents listed above may be obtained from suppliers such as, but not limited to, Dow Chemical or Eastman Chemical. In embodiments, the concentrated cleaning compositions may include at least one cleaning solvent selected from the group consisting of tripropylene glycol methyl ether, dipropylene glycol n-butyl ether, propylene glycol methyl ether, ethylene glycol monohexyl ether, dipropylene glycol n-propyl ether, or combinations of these. Simple glycol solvents may include but are not limited to propylene glycol, hexylene glycol, or combinations of these. In embodiments, the concentrated cleaning composition may include at least one simple glycol solvent, such as propylene glycol, hexylene glycol, or other simple glycol, which may be used individually as the cleaning solvent or combined with one or more of the other cleaning solvents disclosed herein.

The cleaning solvents may include one or more natural solvents such as, but not limited to, D-Limonene, Pine Oil, or combinations of these. The natural solvents, such as D-Limonene, pine oil, or both, may be used by themselves or in combination with synthetic cleaning solvents, such as those previously described herein.

The cleaning solvents may include low molecular weight alcohols, higher molecular weight alcohols, or combinations of alcohols. Higher molecular weight alcohols may include alcohols having molecular weight greater than 61 grams per mole and may be alcohols suitable for hard surface applications. Low molecular weight alcohols refer to alcohols having a molecular weight less than or equal to 61 grams per mole. Low molecular weight alcohols may include, but are not limited to methanol, ethanol, isopropanol, and 1-propanol. However, the use of volatile chemicals, such as low molecular weight alcohols, may be problematic in terms of creating a suitably safe to use unit dose multipurpose cleaner concentrate product. In embodiments, the concentrated cleaning compositions do not include low molecular weight alcohols. In embodiments, the concentrated cleaning composition comprise cleaning solvents having molecular weight greater than 61 grams per mole.

Safer Cleaning Solvents

In embodiments, the concentrated cleaning compositions may include other safer cleaning solvents that may have better safety and environmental profiles compared to the glycol ethers or alcohols, and may be used to create more bio-based products. Some examples of other safer cleaning solvents may include, but are not limited to, 1,3 propanediol, ethyl levulinate glycerol ketal, ethyl levulinate propylene glycol ketal, soybean oil methyl esters, canola oil methyl esters, glycerine, butyl 3-hydroxybutyrate, ethyl lactate, gamma-valerolactone, 2-methyl tetrahydrofuran, cyclopentylmethylether, or combinations of these. Any one or a combination of these other safer cleaning solvents and the aforementioned glycol ethers, alcohols, or natural cleaning solvents may be included in the concentrated cleaning compositions. In embodiments, the cleaning solvents in the concentrated glass cleaning compositions may include at least one safer solvent selected from the group consisting of 1,3 propanediol, ethyl levulinate glycerol ketal, ethyl levulinate propylene glycol ketal, soybean oil methyl esters, canola oil methyl esters, glycerine, butyl 3-hydroxybutyrate, ethyl lactate, gamma-valerolactone, 2-methyl tetrahydrofuran, cyclopentylmethylether, and combinations of these.

The concentrated cleaning compositions may include greater than or equal to 5 wt. %, greater than or equal to 10 wt. %, greater than or equal to 20 wt. %, or greater than or equal to 30 wt. %, cleaning solvents based on the total weight of the concentrated cleaning composition. The concentrated cleaning compositions may include less than or equal to 80 wt. %, less than or equal to 75 wt. %, less than or equal to 70 wt. %, or even less than or equal to 60 wt. % cleaning solvents based on the total weight of the concentrated cleaning composition. The concentrated cleaning compositions may include from 5 wt. % to 80 wt. % cleaning solvents based on the total weight of the concentrated cleaning composition. In embodiments, the concentrated cleaning composition may include from 5 wt. % to 75 wt. %, from 5 wt. % to 70 wt. %, from 5 wt. % to 60 wt. %, from 10 wt. % to 80 wt. %, from 10 wt. % to 75 wt. %, from 10 wt. % to 70 wt. %, from 10 wt. % to 60 wt. %, from 20 wt. % to 80 wt. %, from 20 wt. % to 75 wt. %, from 20 wt. % to 70 wt. %, or from 20 wt. % to 60 wt. %, cleaning solvents based on the total weight of the concentrated cleaning composition.

The concentrated cleaning compositions may include lesser concentrations of glycols, alcohols, or both. In embodiments, the concentrated cleaning compositions may include less than 30 wt. %, less than 20 wt. %, less than 10 wt. %, less than 5 wt. %, or even less than 1 wt. % glycols, alcohols, or both based on the total weight of the concentrated cleaning composition. In embodiments, the concentrated cleaning composition may not include glycols, alcohols, or both as the cleaning solvent. In embodiments, the concentrated cleaning composition does not include glycols, alcohols, or combinations of these.

Surfactants

The concentrated cleaning compositions of the present disclosure may include one or a plurality of surfactants. Surfactants may be included to wet the surface and provide soil emulsification. Surface tension reduction provided by the surfactants, may allow for avoidance of the formation of large droplets (>25 μm), which can diffract visible light when dry, leaving streaks. Surfactant selection and ratios may be determined by balancing the factors of cold water solubility, critical micelle concentration (CMC), hardness ion tolerance, foam generation, and soil removal performance. The surfactants used can be selected from any commercially available anionic and nonionic surfactants suitable to be used in hard surface cleaning. For example, surfactants that can be used in the concentrated cleaning compositions of the present disclosure can include, but are not limited to, one or a combination of anionic and nonionic surfactants, such as sodium alkylbenzene sulfonate (e.g. sodium dodecylbenzene sulfonate or NaDBSA) or other cationic salts of alkylbenzene sulfonate, sodium alkyl methyl ester sulfonate (MES), sodium alkyl sulfate, sodium alkyl ether sulfate, alpha olefin sulfonates (AOS), and alcohol ethoxylates, castor oil ethoxylates or other ethoxylated triglycerides, block co-polymers of ethylene oxide and propylene oxide, and alcohol methyl ester ethoxylates (MEE), and ethyoxlated triglycerides (eg. ethoxylated castor oil).

Anionic surfactants are the principal surfactants for particulate soil removal. Cold water solubility may favor the use of NaDBSA as an anionic surfactant, despite its water hardness intolerance. The monoethanolamine salt of DBSA can be used due to solubility considerations. Alkyl sulfates, despite water hardness intolerance, and can be incorporated. Branched chain alkyl sulfates have better cold water solubility than straight chain, and smaller hydrophobic chain surfactants dissolve faster, however a balance between solubility, speed, CMC, oil/water interfacial tension and soil removal performance can be considered. Alkyl ethoxylated or alkoxylated sulfates may also be included in the concentrated cleaning compositions due to better water hardness tolerance relative to NaDBSA and alkyl sulfates. Alcohol alkoxylated sulfates that have branched hydrophobes may offer improved solubility, and alcohol alkoxylated sulfates with relatively long hydrophobic (with branching) and hydrophilic groups may be included to provide for cold water detergency, offering low interfacial tension and fast solubilization. Sodium alkyl methyl ester sulfonates are a class of anionic surfactants that have good water hardness tolerance and low CMC relative to NaDBSA.

Nonionic surfactants, primarily alcohol ethoxylates and alkoxylates, both linear and branched (improved water solubility) may also be included in the concentrated cleaning compositions, specifically for very hydrophobic oily soil removal. These nonionic surfactants generally may have a lower CMC and lower oil/water interfacial tension than most anionic surfactants. Melting point, dissolution rate, water solubility, oil/water interfacial tension and CMC may be considered in selection of nonionic surfactants. The degree of branching, the position and length of branches, the relative size of the hydrophobic and hydrophilic groups and the composition of the hydrophilic groups are all chemical variables impacting physical, chemical, and performance properties of the nonionic surfactants. Guerbet alcohol ethoxylates (branched) are particularly useful in cold water, due to improved solubility. Narrow range ethoxylates can be used for improved water solubility and performance as well. Smaller molecules, with the appropriate balance of hydrophobe to hydrophile size, such as C8-C10 hydrophobes with 6 moles of EO (ethylene oxide units) for example, offer faster dissolution and better cold water solubility compared to some other nonionic surfactants with C12-C14 or C12-C15 hydrophobes with 7-9 moles of EO. Fatty acid methyl ester ethoxylates and ethoxylates of vegetable oils that include complex mixtures of both hydrophilic and hydrophobic substances can be useful in some formulations of the concentrated cleaning compositions. The latter, when castor oil is used and ethoxylated, may contain glycerol polyethylene glycol ricinoleate, fatty acid esters of polyethylene glycol and some unchanged vegetable oil, as well as polyethylene glycols and glycerol ethoxylates.

In embodiments, other classes of surfactants, such as alkyl polyglucosides can be included in the concentrated cleaning compositions. These surfactants can provide a better safety and sustainability/environmental profile. The alkyl polyglucosides in combination with newer solvent-surfactant hybrids can be used to prepare concentrated cleaning compositions with a very high bio-based carbon content. In embodiments, the concentrated cleaning compositions may include at least one alkyl polyglucoside in which the alkyl group comprises from 8 to 16 carbon atoms. In embodiments, the concentrated cleaning compositions may include caprylyl polyglucoside, decyl polyglucoside, or combinations of these.

In embodiments, amphoteric and/or ampholytic surfactants can be used in the concentrated cleaning compositions. Such examples include but are not limited to surfactant classes such as betaines, hydroxyl sultaine, amphoacetates, amphopropionates, aminopropionates (e.g. ampholytic), amine oxides (e.g. ampholytic), ethoxylated amine based chemistry (e.g. polyoxyethylene isodecyloxypropyl-amine and bis-(2-hydroxyethyl) isodecyloxypropyl-amine) and quaternized amine chemistry. When considering cationic surfactants, their incompatibility with anionic surfactants may be a limitation. In embodiments, the concentrated cleaning compositions may not include a cationic surfactant.

In embodiments, involving the design of high performance disinfecting cleaners with registered disinfectants that use quaternary ammonium compounds as the disinfecting substance(s), the use of some types of anionic surfactants may be incompatible with cationic biocide, such as quaternary ammonium compounds, however there are exceptions. In embodiments, the concentrated cleaning composition may include quaternary ammonium compounds or other cationic biocides as the germicidal and/or antimicrobial agents and the surfactants may be nonionic surfactants, such as but not limited to alcohol ethoxylates and another complimentary nonionic surfactants such as alkyl polyglucosides.

The concentrated cleaning compositions may include greater than or equal to 0 wt. % (zero wt. %), greater than or equal to 1 wt. %, greater than or equal to 5 wt. %, or even greater than or equal to 10 wt. % surfactants based on the total weight of the concentrated cleaning composition. The concentrated cleaning compositions may include less than or equal to 80 wt. %, less than or equal to 75 wt. %, less than or equal to 70 wt. %, or even less than or equal to 60 wt. % surfactants based on the total weight of the concentrated cleaning composition. The concentrated cleaning compositions may include from 0 wt. % to 80 wt. %, from 0 wt. % to 75 wt. %, from 0 wt. % to 70 wt. %, from 0 wt. % to 60 wt. %, from 1 wt. % to 80 wt. %, from 1 wt. % to 75 wt. %, from 1 wt. % to 70 wt. %, from 1 wt. % to 60 wt. %, from 5 wt. % to 80 wt. %, from 5 wt. % to 75 wt. %, from 5 wt. % to 70 wt. %, from 5 wt. % to 60 wt. %, from 10 wt. % to 80 wt. %, from 10 wt. % to 75 wt. %, from 10 wt. % to 70 wt. %, or from 10 wt. % to 60 wt. % surfactants based on the total weight of the concentrated cleaning composition. Surfactants are often available as surfactant compositions comprising one or more surfactants dispersed in a medium, such as water or other solvent. The weight percentages in this paragraph are based on the total weight of surfactant compositions comprising the surfactants, including any diluents.

The unit dose multi-purpose cleaner concentrate product can comprise a total weight percentage of the cleaning solvents and surfactants of at least 50 wt. %, at least 60 wt. %, or even at least 70 wt. % cleaning solvents and surfactants based on the total weight of the unit dose multi-purpose cleaner concentrate product, where the weight percentages are expressed on an anhydrous basis (e.g., without accounting for the weight of water in the surfactants or cleaning solvents). In embodiments, the unit dose multi-purpose cleaner concentrate product comprises from 50 wt. % to 100 wt. %, from 50 wt. % to 90 wt. %, from 50 wt. % to 80 wt. %, from 60 wt. % to 100 wt. %, from 60 wt. % to 90 wt. %, from 60 wt. % to 80 wt. %, from 70 wt. % to 100 wt. %, from 70 wt. % to 90 wt. %, or from 70 wt. % to 80 wt. % cleaning solvents and surfactants, on an anhydrous basis, based on the total weight of the unit dose multi-purpose cleaner concentrate product.

Disinfecting Agents and/or Antimicrobial Agents

The concentrated cleaning compositions may include one or more disinfecting agents and/or antimicrobial agent(s), which may include active ingredients with germicidal activity, preservatives, or combinations of these. In embodiments, the concentrated cleaning compositions may include a disinfecting agent or agents or other active ingredients with germicidal activity. The disinfecting agents can include one or more EPA registered disinfectants for a germicidal claim or a disinfectant that is not registered but permitted to be used for general cleaning. Disinfecting agents or other active ingredients with germicidal activity can include, but are not limited to, the following: acids or their neutralized salt formats, such as caprylic acid, citric acid, glycolic acid, lactic acid, salicylic acid, or peroxyacetic acid; phenols; quaternary ammonium compounds (e.g. alkyl dimethyl benzyl ammonium chlorides, with any number of percentage distributions of alkyl carbon chains between C8 and C18, didecyl dimethyl ammonium chloride, dioctyl dimethyl ammonium chloride, octyl decyl dimethyl ammonium chloride, alkyl dimethyl ethyl benzyl ammonium chloride, benzalkonium chloride, alkyl dimethyl benzyl ammonium saccharinate, or any combination of quaternary ammonium compounds that can be used as disinfectants); botanical agents such as thymol or pine oil compositions; other safer choice compounds such as silver dihydrogen citrate; or any combinations of these aforementioned disinfectants.

In embodiments, other blends of disinfecting agents having germicidal activity can be considered at sufficiently high concentrations in the concentrated cleaning compositions to create an effective disinfectant cleaning solution upon dilution by a factor of 25-200 times with water. In embodiments, the blends of disinfecting agents can include but are not limited to blends of one or more of n-alkyl dimethyl benzyl ammonium chloride, dioctyl dimethyl ammonium chloride, n-octyl decyl dimethyl ammonium chloride, didecyl dimethyl ammonium chloride, other of the aforementioned disinfectants, or combinations of these. In embodiments, the concentrated cleaning compositions may include at least one disinfecting agent selected from the group consisting of n-alkyl dimethyl benzyl ammonium chloride, n-alkyl dimethyl ethylbenzyl ammonium chloride, alkyl dimethyl benzyl ammonium chlorides having alkyl carbon chains between C8 and C18, didecyl dimethyl ammonium chloride, dioctyl dimethyl ammonium chloride, n-octyl decyl dimethyl ammonium chloride, alkyl dimethyl ethyl benzyl ammonium chloride, benzalkonium chloride, alkyl dimethyl benzyl ammonium saccharinate, and combinations of these.

Encapsulated or coated sodium dichloroisocyanurate or other encapsulated chlorine releasing compound(s) or encapsulated or coated peroxide or peracid releasing chemicals could also be used in the concentrated cleaning composition and suspended in the liquid base of the concentrated cleaning compositions. The liquid base may refer to the liquid components of the concentrated cleaning compositions, such as the cleaning solvents and any other liquids.

The concentrated cleaning compositions may include an amount of disinfecting agents and/or active ingredients with germicidal activity sufficient to provide a disinfecting property to a diluted multi-purpose cleaning solution prepared from the unit dose multi-purpose cleaner concentrate product by diluting the unit dose multi-purpose cleaner concentrate product by a factor of from 25 to 200 times with water. The concentrated cleaning compositions may include greater than or equal to 0 wt. %, greater than or equal to 1 wt. %, greater than or equal to 5 wt. %, or greater than or equal to 10 wt. % disinfecting agents and/or active ingredients with germicidal activity based on the total weight of the concentrated cleaning composition. The concentrated cleaning compositions may include less than 50 wt. %, less than or equal to 40 wt. %, less than or equal to 30 wt. %, or even less than or equal to 20 wt. % disinfecting agents and/or active ingredients with germicidal activity based on the total weight of the concentrated cleaning composition. In embodiments, the concentrated cleaning compositions may include from 0 wt. % to 50 wt. %, from 1 wt. % to 40 wt. %, from 1 wt. % to 30 wt. %, 1 wt. % to 20 wt. %, or 5 wt. % to 40 wt. % disinfecting agents and/or active ingredients with germicidal activity based on the total weight of the concentrated cleaning composition. In embodiments, the concentrated cleaning compositions may not include the disinfectant and/or the active ingredient with germicidal activity.

In embodiments, the concentrated cleaning compositions of the present disclosure may include one or a plurality of antimicrobial agents, which may be operable as preservatives to prevent microbial growth in the diluted multi-purpose cleaning solution prepared by dilution of the unit dose multi-purpose cleaner concentrate product by 25 to 200 times with water. In some embodiments, the antimicrobial agents may be included as preservatives, if the diluted product is able to support microbial growth. This will depend upon, among other things, the pH once diluted and the overall composition of surfactants and solvents. It is understood that the polyvinyl alcohol film, once dissolved in the water of the diluted multi-purpose cleaning solution, may be a nutrient source that can facilitate microbial growth. The antimicrobial agent(s) can be selected such that it is effective across bacteria, yeast and molds. Any one of many antimicrobial agents and preservatives, approved for use in household cleaning products may be considered. In particular, antimicrobial agents suitable for inclusion in the concentrated cleaning compositions of the present disclosure may include, but are not limited to, methylchloroisothiazolinone, methylisothiazolinone, benzisothiazolinone, benzalkonium chloride, benzethonium chloride, benzoic acid or sodium benzoate, benzyl alcohol, chloroxylenol, salicylic acid or its metal salt form, sorbic acid or its metal salt form, or some combination of these. It is understood that antimicrobial agents other than those listed may also be suitable for use in the concentrated cleaning compositions of the present disclosure.

The concentrated cleaning compositions may include greater than or equal to 0 wt. %, greater than or equal to 0.1 wt. %, or even greater than or equal to 1 wt. % antimicrobial agents based on the total weight of the concentrated cleaning composition. The concentrated cleaning compositions may include less than or equal to 50 wt. %, less than or equal to 20 wt. %, less than or equal to 15 wt. %, or even less than or equal to 10 wt. % antimicrobial agents based on the total weight of the concentrated cleaning composition. The concentrated cleaning compositions may include from 0 wt. % to 20 wt. %, from 0.1 wt. % to 20 wt. %, from 1 wt. % to 20 wt. %, or from 1 wt. % to 15 wt. % antimicrobial agents based on the total weight of the concentrated cleaning composition. In embodiments, the concentrated cleaning compositions may not include antimicrobial agents.

The concentrated cleaning compositions may include a total amount of disinfecting agents and antimicrobial agents of greater than or equal to 0 wt. %, greater than or equal to 1 wt. %, or greater than or equal to 5 wt. % based on the total weight of the concentrated cleaning composition. The concentrated cleaning compositions may include a total amount of disinfecting agents and antimicrobial agents of less than 50 wt. %, less than or equal to 40 wt. %, less than or equal to 30 wt. %, or even less than or equal to 20 wt. % based on the total weight of the concentrated cleaning composition. In embodiments, the concentrated cleaning compositions may include a total amount of disinfecting agents and antimicrobial agents of from 0 wt. % to 50 wt. %, from 1 wt. % to 40 wt. %, from 1 wt. % to 30 wt. %, 1 wt. % to 20 wt. %, or 5 wt. % to 40 wt. % based on the total weight of the concentrated cleaning composition. In embodiments, the concentrated cleaning compositions may not include disinfecting agents and antimicrobial agents.

Water

The concentrated cleaning compositions can include some water, whether introduced through one or more constituents (e.g., surfactant compositions or other constituents that include at least some water content) or added purposefully. In embodiments, the concentrated cleaning compositions may include less than or equal to 20 wt. %, less than or equal to 15 wt. %, less than or equal to 10 wt. %, less than or equal to 5 wt. %, or even less than or equal to 2 wt. % water based on the total weight of the concentrated cleaning composition.

Chelants and Dispersive Polymers

The concentrated cleaning compositions of the present disclosure may include one or more chelants, one or more dispersive polymers, or both. These chelants and/or dispersive polymers may be used as water hardness control agents given that the dilution of the concentrated cleaning compositions may involve the use of municipal water of varying hardness, and that, in specialty applications, the surfaces to be cleaned may include hardness stains (e.g., glass shower stalls). In some instances, chelants may chemically chelate and leach out metal ions from glass or other materials, thereby damaging the surface. Thus, in some embodiments, the concentrated glass cleaning composition may not include chelants. However, in embodiments, when only hard water is available for dilution of the concentrate, and/or when the surfaces require the removal of hardness stains, some level of a chelant, or chelating polymer or dispersive polymer in the concentrated cleaning compositions may be used. Strong chelants have high stability constant logarithms for both calcium and heavier metal ions (e.g., pK(Ca) greater than 5, where pK(Ca) is the stability constant logarithm for calcium) at the relevant wash pH conditions. The stability constant logarithm, pK(M) is a measure of the strength of the complex between the metal ion (M) and the chelant at the relevant wash pH conditions. Chelation with the strong metal ion chelant provides water soluble chelation. In some embodiments, the strong chelant may include N,N-bis(carboxymethyl) glutamic acid (GLDA). Other strong chelants that may be incorporated may include, but are not limited to, methylglycine diacetic acid (MGDA), ethylene diamine tetraacetic acid (EDTA), iminodisuccinic acid (IDS), other strong chelants, or combinations of these. In embodiments, the concentrated cleaning composition may include one or more strong chelants selected from the group consisting of N,N-bis(carboxymethyl) glutamic acid (GLDA), methylglycine diacetic acid (MGDA), ethylene diamine tetraacetic acid (EDTA), iminodisuccinic acid (IDS), other strong chelants, and combinations of these. In some embodiments, the concentrated glass cleaning composition does not include a strong chelant.

In embodiments, the concentrated cleaning compositions may include one or more weak chelants, with or without the presence of a strong chelant. Weak chelants may include, but are not limited to, sodium citrate, sodium citrate dihydrate, or combinations thereof. In some embodiments, the weak chelant may be a citrate formed in situ during manufacturing of the composition through the reaction of citric acid and an alkaline material in the concentrated cleaning composition or some component of the concentrated cleaning composition. In some embodiments, other weak chelants, such as ethylenediamine-N,N-disuccinic acid (EDDS) for example, may be incorporated into the concentrated cleaning compositions. In some embodiments, the concentrated cleaning composition does not include weak chelants. In some embodiments, the concentrated cleaning composition may include one or more weak chelants but does not include strong chelants. In some embodiments, the concentrated cleaning composition may include one or more strong chelants, but does not include weak chelants.

The concentrated cleaning compositions may include greater than or equal to 0 wt. %, greater than or equal to 0.1 wt. %, or even greater than or equal to 1 wt. % chelants based on the total weight of the concentrated cleaning composition. The concentrated cleaning compositions may include less than or equal to 40 wt. %, less than or equal to 30 wt. %, or even less than or equal to 20 wt. % chelants based on the total weight of the concentrated cleaning composition. The concentrated cleaning compositions may include from 0 wt. % to 40 wt. %, from 0.1 wt. % to 30 wt. %, from 0.1 wt. % to 20 wt. %, or from 1 wt. % to 20 wt. % chelants based on the total weight of the concentrated cleaning composition.

In embodiments, the concentrated cleaning composition may include one or more dispersive polymers. The dispersive polymers may be used as water hardness control agents given that the dilution of the concentrated cleaning compositions may involve the use of municipal water of varying hardness. Dispersive polymers may include, but are not limited to, acrylate polymers, acrylic/maleic copolymers, terpolymers, copolymers of carboxylic acid containing monomer units and sulfonic acid containing monomer units, polymers using itaconic acid monomers, sulfonic acid/sulfonated styrene monomers, or combinations of these polymers.

The concentrated cleaning compositions may include greater than or equal to 0 wt. %, greater than or equal to 0.1 wt. %, or even greater than or equal to 1 wt. % dispersive polymers based on the total weight of the concentrated cleaning composition. The concentrated cleaning compositions may include less than or equal to 20 wt. %, less than or equal to 15 wt. %, or even less than or equal to 10 wt. % dispersive polymers based on the total weight of the concentrated cleaning composition. The concentrated cleaning compositions may include from 0 wt. % to 20 wt. %, from 0.1 wt. % to 20 wt. %, from 1 wt. % to 20 wt. %, or from 1 wt. % to 15 wt. % dispersive polymers based on the total weight of the concentrated cleaning composition. In embodiments, the concentrated cleaning compositions may not include dispersive polymers.

Solvents and Coupling Agents with Surfactant Augmenting Properties

In embodiments, the concentrated cleaning compositions can include dual functional solvents that can have solvent functionality and coupling agent ability, can augment surfactant performance, and in some case can be regarded as hybrids of solvent and surfactant (i.e., dual-functionally). These dual-functional solvents are largely water insoluble or sparingly soluble and can work synergistically with other surfactants to form mixed surfactant micelles with improved overall wetting performance. These dual-functional solvents may also be able to assist in the dissolution of fragrance materials and other very hydrophobic materials. One example of a dual-functional solvent is the class of chemicals N-alkyl-2-pyrrolidone, where alkyl can be, as examples, octyl or dodecyl (e.g., Surfadone LP 100 and 300 marketed by ISP). This chemistry of N-alkyl-2-pyrrolidone and its utility in cleaning compositions is discussed in detail in U.S. Pat. No. 5,093,031, which is incorporated by reference herein in its entirety. These dual-functional substances/solvents can be formulated with other solvents (e.g., glycol ethers, lower alcohols) and anionic and nonionic surfactant combinations. In embodiments, the concentrated cleaning composition may include N-alkyl-2-pyrrolidones.

The concentrated cleaning compositions may include greater than or equal to 0 wt. %, greater than or equal to 0.1 wt. %, or even greater than or equal to 1 wt. % dual-functional solvents based on the total weight of the concentrated cleaning composition. The concentrated cleaning compositions may include less than or equal to 20 wt. %, less than or equal to 15 wt. %, or even less than or equal to 10 wt. % dual-functional solvents based on the total weight of the concentrated cleaning composition. The concentrated cleaning compositions may include from 0 wt. % to 20 wt. %, from 0.1 wt. % to 20 wt. %, from 1 wt. % to 20 wt. %, or from 1 wt. % to 15 wt. % dual-functional solvents based on the total weight of the concentrated cleaning composition. In embodiments, the concentrated cleaning compositions may not include dual-functional solvents.

Alkalinity and pH Control Agents

The concentrated cleaning compositions of the present disclosure may additionally include an alkaline compound or other pH control agent. Alkaline compounds may provide cleaning and pH control in the alkaline region for effective cleaning. In embodiments, the concentrated cleaning compositions may include one or more alkaline compounds, one or more pH control agents, or combinations of these.

In embodiments, ammonia may be used as the pH control agent in the concentrated cleaning compositions. In other embodiments, any number of pH control agents can be used. For example, the use of either inorganic (e.g., hydroxides, carbonates, etc.), or organic (e.g., amines, monoalkylamines, dialkylamines, and trialkylamines with 1 to 4 carbon atoms in the alkyl radical, the corresponding mono-, di-, or trialkanolamines with 2 to 4 carbons atoms in each alkylol, cycloalkylamines, and heterocyclic amines) compounds for pH control may be included in the concentrated cleaning compositions. In embodiments, the concentrated cleaning compositions may include monoisopropanolamine, diisopropanolamine, or both as a pH control agent.

In some embodiments, the raw materials used and the low water content of the concentrated cleaning compositions may provide for a very alkaline pH of the concentrated cleaning compositions, and the use of an acidic pH adjusting agent (e.g. citric acid or alternative acidic pH adjusting agent) may be included in the concentrated cleaning compositions.

The concentrated cleaning compositions may include greater than or equal to 0 wt. %, greater than or equal to 0.1 wt. %, or even greater than or equal to 1 wt. % pH control agents, alkaline compounds, or both, based on the total weight of the concentrated cleaning composition. The concentrated cleaning compositions may include less than or equal to 30 wt. %, less than or equal to 25 wt. %, less than or equal to 20 wt. %, or even less than or equal to 15 wt. % pH control agents, alkaline compounds, or both, based on the total weight of the concentrated cleaning composition. The concentrated cleaning compositions may include from 0.1 wt. % to 30 wt. %, from 1 wt. % to 30 wt. %, from 1 wt. % to 25 wt. %, or from 2 wt. % to 20 wt. % pH control agents, alkaline compounds, or both, based on the total weight of the concentrated cleaning composition. In embodiments the concentrated cleaning composition may not include a pH control agent, an alkaline compound, or both.

Surface Modification Additives (e.g. Antifogging) and Improved Wetting

In embodiments, one or more surface modification polymers that have an antifogging or improved wetting effect may be included in the concentrated cleaning compositions of the present disclosure. These surface modification polymers can increase the hydrophilicity of the surface for improved wetting, anti-fog, and rapid drying. These surface modification polymers can include, but are not limited to, copolymers of ethylenically-unsaturated dicarboxylic acid anhydride or partial ester thereof with an ethylenically-unsaturated monomer that has no carboxyl groups (U.S. Pat. No. 3,939,090), styrene/maleic anhydride copolymer (U.S. Pat. No. 3,696,043), high mole weight water soluble non-ionic polyoxyethylene glycol (U.S. Pat. No. 4,242,725), and polyvinyl alcohol of various molecular weights (U.S. Pat. No. 4,539,145). U.S. Pat. Nos. 3,939,090, 3,696,043, 4,242,725, and 4,539,145 are incorporated by reference herein in their entirety. In embodiments, the concentrated cleaning compositions can include copolymers of methyl vinyl ether and maleic anhydride (e.g., GANTREZ™ s-97 copolymers produced by Ashland). Other anti-fog polymers can include cationic hydrophilic polymers, such as NOVERITE™ 311 functional polymers produced by The Lubrizol Corporation, which could be incorporated into some embodiments of the concentrated cleaning composition.

The concentrated cleaning compositions may include greater than or equal to 0 wt. %, greater than or equal to 0.1 wt. %, or even greater than or equal to 1 wt. % surface modification polymers based on the total weight of the concentrated cleaning composition. The concentrated cleaning compositions may include less than or equal to 20 wt. %, less than or equal to 15 wt. %, or even less than or equal to 10 wt. % surface modification polymers based on the total weight of the concentrated cleaning composition. The concentrated cleaning compositions may include from 0 wt. % to 20 wt. %, from 0.1 wt. % to 20 wt. %, from 1 wt. % to 20 wt. %, or from 1 wt. % to 15 wt. % surface modification polymers based on the total weight of the concentrated cleaning composition. In embodiments, the concentrated cleaning compositions may not include surface modification polymers or additives.

Suspended Chemicals in the Liquid Concentrate

In embodiments, the concentrated cleaning compositions may include a plurality of suspended solid particles comprising one or more active ingredients or solvents of the concentrated cleaning composition disclosed herein. Given that the concentrated liquid of the concentrated cleaning composition is almost devoid of water, (i.e., only 1-15% free water by weight), embodiments of the present disclosure may include using, within the concentrated liquid, suspended solid particles of water-soluble polyvinyl alcohol or other polymers or surfactants or other surface modification agents, that would be fully dissolved upon dilution of the concentrated cleaning composition. Thus, in embodiments, the concentrated cleaning compositions may include a plurality of solid suspended particles comprising one or more active ingredients (e.g., water soluble PVA or other polymers, surfactants, surface modification additives, etc.) of the concentrated cleaning compositions. The suspended solid particles may include one or more of water-soluble polymer additives, surfactants, co-solvents, chelants, preservatives, alkaline compounds, pH control agents, chelating polymers, dispersive polymers, or combinations of these.

Additionally, the concentrated cleaning compositions of the present disclosure may further comprise one or more suspending agents, structuring agents, thickening agents, or combinations of these, wherein the suspending agents, structuring agents, thickening agents, or combinations of these improve suspension of the solid particles in the cleaning solvents. In embodiments, the concentrated cleaning compositions may include one or more structuring agents (e.g., cross linked polyacrylates, or naturally derived structuring agent chemicals) that may provide thixotropy, psuedoplasticity or other viscosity building effects in the liquid base of the concentrated cleaning compositions to aid in suspension of such suspended solid particles. In embodiments, the concentrated cleaning compositions may not include solid suspended particles.

Hydrotropes and Solubilizers

In embodiments, the concentrated cleaning compositions may include hydrotropes or coupling agents/solubilizers to assist making the surfactants and solvents more soluble in the sparingly aqueous concentrate. The hydrotropes may be synthetic or naturally derived. Some examples or hydrotropes include, but are not limited to, sodium xylene sulfonate, sodium cumene sulfonate, sodium n-octyl sulfate, or combinations of these. Some examples of coupling agents/solubilizers that can be incorporated into the concentrated cleaning compositions for making the concentrated cleaning compositions compatible with the PVA film or for making the ingredients soluble with each other may include, but are not limited to, propylene glycol, dipropylene glycol, glycerine, other solubilizers used in household cleaning formulations, or combinations of these.

The concentrated cleaning compositions may include greater than or equal to 0 wt. %, greater than or equal to 0.1 wt. %, or even greater than or equal to 1 wt. % hydrotropes, coupling agents/solubilizers, or both, based on the total weight of the concentrated cleaning composition. The concentrated cleaning compositions may include less than or equal to 30 wt. %, less than or equal to 25 wt. %, or even less than or equal to 20 wt. % hydrotropes, coupling agents/solubilizers, or both, based on the total weight of the concentrated cleaning composition. The concentrated cleaning compositions may include from 0 wt. % to 30 wt. %, from 0.1 wt. % to 30 wt. %, from 1 wt. % to 30 wt. %, or from 1 wt. % to 25 wt. % hydrotropes, coupling agents/solubilizers, or both, based on the total weight of the concentrated cleaning composition. In some embodiments, the concentrated cleaning compositions may not include hydrotropes. In some embodiments, the concentrated cleaning compositions may not include coupling agents/solubilizers.

Other Additives

Colorant(s), fragrances, or both may be included in the concentrated cleaning compositions for aesthetic purposes. In embodiments, the concentrated cleaning compositions do not include colorants, fragrances, or both. One or a plurality of enzymes may be included in the concentrated cleaning compositions for unique cleaning applications. Examples of enzymes may include hydrolases, such as but not limited to proteases, amylases, lipases, or other hydrolases. In embodiments, the concentrated cleaning composition may not include enzymes.

As previously discussed, in embodiments, the concentrated cleaning compositions may include a thickening agent to improve the rheological behavior (i.e. low drainage rate after spraying onto vertical surfaces) of the dilute cleaning solution made using the concentrated cleaning compositions. The thickening agents may also be used to suspend solid particles of functional ingredients within the liquids of the concentrated cleaning composition. Thickening agents include any or all synthetic or natural agents that provide increased viscosity and/or pseudoplasticity and/or thixotropy to the liquid, and can include, but not limited to, polymers such as cross-linked polyarcylates (e.g., CARBOPOL® brand thickeners from The Lubrizol Corporation), amide polymers, and/or natural thickeners such as xanthan gum, and others. In some embodiments, the concentrated glass cleaning compositions do not include thickening agents.

Encasing Film

The unit dose multi-purpose cleaner concentrate product may include the concentrated cleaning composition contained within a packet or pouch formed from polyvinyl alcohol (PVA or PVOH) films. The PVA films may have suitable mechanical and chemical properties, as defined by the degree of hydrolysis of the polyvinyl acetate to alcohol and the degree of polymerization, the solvents, plasticizers used and other processing and formulation aspects. The PVA film can be able to form a packet or pouch of sufficient mechanical strength to meet consumer regulations and can provide for a product that has suitable stability on storage under a variety of temperature and humidity conditions as experienced in commerce and consumer households. PVA films produced by Aicello or Kuraray (MonoSol division) may be used, but there are many other commercial suppliers.

In some embodiments, films may be formulated with combinations of one or more of polyvinyl alcohol and polyvinyl pyrrolidone, ethoxylated alkyphenol, polyacrylic acid and polyhydric alcohol (U.S. Pat. Nos. 4,481,326, 4,544,693, 4,692,494, 4,765,916, which are incorporated by reference herein in their entirety); water soluble laminate films that comprise at least one methylcellulose layer of hydroxybutyl methylcellulose blended with hydroxypropyl methylcellulose and polyvinyl alcohol as a cross linking agent (U.S. Pat. No. 4,801,636, which is incorporated by reference herein in its entirety); blends of polyvinyl alcohol and alkyl cellulose with a metalloid oxide to inhibit dissolution of the film encasing a strongly alkaline liquid but allow dissolution in a less alkaline solution (U.S. Pat. No. 4,972,017, which is incorporated by reference herein in its entirety); or films with polyvinyl alcohol and a water insoluble cellulose material (U.S. Pat. No. 5,272,191, which is incorporated by reference herein in its entirety).

In some embodiments, the utility of polyvinyl alcohol, in improving wetting of the surfaces to be cleaned through surface modification, suggests that the encasing film may be further optimized in terms of using specific molecular weights or blends of molecular weights of polyvinyl alcohol within the composition of the encasing film, so that on dissolution to the dilute product, an optimum wetting performance can be achieved.

The unit dose multi-purpose cleaner concentrate product may be prepared by preparing the concentrated cleaning composition and sealing a portion of the concentrated cleaning composition within a pouch or packet formed by a water soluble film, such as PVA film or other water soluble polymer film. Preparing the concentrated cleaning composition may include combining one or more of the constituents of the concentrated cleaning composition and mixing the combined constituents to produce a homogeneous concentrated cleaning composition. The constituents of the concentrated cleaning composition may be any of the constituents previously described in this disclosure, such as but not limited to one or more cleaning solvents, one or more surfactants, one or more antimicrobial agents (disinfectants, active ingredients with germicidal properties, preservatives, or combinations of these), one or more chelants, one or more dual-functional substances/solvents, one or more alkaline compounds, one or more pH control agents, one or more preservatives, one or more dispersive polymers, one or more surface modification additives, one or more hydrotropes, one or more coupling agents/solubilizers, one or more thickening agents, one or more enzymes, one or more fragrance/colorants, or combinations of these. The pouches or packets containing the concentrated cleaning composition may be produced and sealed by any known machine and/or technique.

Each packet or pouch of the unit dose multi-purpose cleaner concentrate product may include from 4 grams to 50 grams of the concentrated cleaning composition. In embodiments, each packet or pouch may have a size of from 4 grams to 20 grams and a geometry to enable the packet or pouch to be conveniently inserted into a small bottle neck (e.g. neck having an inner diameter of from 20 mm to 25 mm) for use in commercially available trigger spray bottles. The shape of the packets or pouches may be long and cylindrical in shape, with rounded ends, and with a length to diameter ratio from 2:1 to 20:1. Such shapes could be used for domestic spray trigger bottles with standard 28-400 neck finishes, or other similar dimensions. The packets or pouches may also be considered for larger bottles with larger openings, and may be formed into a variety of shapes, sizes and liquid compartments. In some embodiments, each packet or pouch of the unit dose multi-purpose cleaner concentrate product may could be from 20 grams to 50 grams in mass so as to be used for larger spray or dispensing containers for institutional or industrial use.

The unit dose multi-purpose cleaner concentrate products may be overpacked in an overpack container comprising plastic overpack pouches, tubs, or other containers. The overpack container may have one or more safety closures, such as but not limited to child safety closures. In embodiments, a multi-purpose cleaner concentrate kit may include a plurality of unit dose multi-purpose cleaner concentrate products of the present disclosure contained within an overpack container.

A dilute multi-purpose cleaning solution may be prepared from the unit dose multi-purpose cleaner concentrate product of the present disclosure. The dilute multi-purpose cleaning solution may be prepared by diluting the unit dose multi-purpose cleaner concentrate product with water at a dilution factor of from 25 to 200, such as from 25 to 175, from 25 to 150, from 50 to 200, from 50 to 175, from 50 to 150, from 100 to 200, from 100 to 175, or from 100 to 150. The unit dose multi-purpose cleaner concentrate product may be diluted by combining the unit dose multi-purpose cleaner concentrate product with water at the dilution factor above and then mixing the unit dose multi-purpose cleaner concentrate product and water. Contact of the encasing film with water may cause the encasing film to dissolve in the water and allow the concentrated cleaning composition to mix with the water to form the diluted multi-purpose cleaning solution.

A method of cleaning a surface may include providing the unit dose multi-purpose cleaner concentrate product comprising a unit dose packet or pouch containing the concentrated cleaning compositions as described in the present disclosure. The method may further include adding the unit dose multi-purpose cleaner concentrate product to a vessel, such as but not limited to a spray bottle, bucket, or other container, and adding water to the unit dose packet or pouch, where adding water to the unit dose packet or pouch causes a film of the unit dose packet or pouch to dissolve, releasing the concentrated cleaning composition into the water. Adding the unit dose packet or pouch to the vessel may include inserting the packet or pouch into the vessel. The concentrated cleaning composition of the unit dose multi-purpose cleaner concentrate product may be diluted by from 25 times to 200 times in water. The method may include mixing or agitating the water and concentrated cleaning composition to produce a dilute multi-purpose cleaning solution. The method may further include contacting the dilute multi-purpose cleaning solution with the surface. The method may further include wiping the dilute multi-purpose cleaning solution off the surface.

In embodiments, the unit dose multi-purpose cleaner concentrate product may include the concentrated cleaning composition enclosed within a water soluble film, and the concentrated cleaning composition may comprise, consist, or consist essentially of: (1) one or more cleaning solvents, (2) one or more surfactants, (3) one or more antimicrobial agents, (4) optionally, one or more colorants, fragrances, or both, (5) optionally, some water content in the concentrated version for the purpose of polyvinyl alcohol film stability and packet/pouch integrity on storage, (6) optionally, one or more pH control agents, alkaline compounds, or both, (7) optionally, one or more chelants, (8) optionally, one or more dispersive polymers, (9) optionally, one or more surface modification agents, (10) optionally, one or more enzymes, and (11) optionally, a thickening agent. The antimicrobial agents may include disinfectants, active ingredients having germicidal properties, preservatives, or combinations of these. The cleaning solvents, surfactants, colorants, fragrances, antimicrobial agents, disinfectants, active agents having germicidal properties, preservatives, pH control agents, alkaline compounds, chelants, dispersive polymers, surface modification agents, enzymes, and thickening agents may have any of the features, compositions, or weight percentages previously described for each of these compounds.

In embodiments, the unit dose multi-purpose cleaner concentrate product may include the concentrated cleaning composition enclosed within a water soluble film, and the concentrated cleaning composition may comprise, consist, or consist essentially of: from 5 wt. % to 80 wt. % cleaning solvents; from 5 wt. % to 80 wt. % surfactant; from 1 wt. % to 50 wt. % disinfecting agent, antimicrobial agent, or both; less than or equal to 20 wt. % water; optionally, from 0 wt. % to 40 wt. % chelants; optionally, from 0 wt. % to 20 wt. % dispersive polymers; optionally, from 0 wt. % to 20 wt. % dual-functional solvents; optionally, from 0 wt. % to 30 wt. % pH control agents, alkaline compounds, or both; optionally, from 0 wt. % to 20 wt. % surface modification additives; optionally, from 0 wt. % to 30 wt. % hydrotropes, solubilizers, or combinations of these; optionally, one or more enzymes; optionally, one or more thickeners; and optionally, one or more colorants, fragrances, or both. In embodiments, the concentrated cleaning composition may comprise, consist, or consist essentially of greater than or equal to 10 wt. % disinfecting agents based on the total weight of the concentrated cleaning composition.

EXAMPLES

The following examples demonstrate formulations of the concentrated cleaning compositions that have been successfully prepared and encapsulated into stable liquid packets/pouches with good shelf life properties to produce the unit dose multi-purpose cleaner concentrate products. Many of the formulations in the Examples contain one or more solvents, other than low molecular weight alcohols, that have differing Hansen solubility parameters, one or more surfactants, a strong chelant for metal ions, and one or more disinfectant and/or antimicrobial agent(s). The antimicrobial agent(s) is often used as a disinfectant chemical(s) for the diluted product to be able to disinfect surfaces, but may also be incorporated only for product preservation in the case of a formulation that is not to be registered as a disinfectant. Optionally, alkalinity and other pH control agents, dyes or pigment colorants, and other aforementioned performance or aesthetic agents can be incorporated.

The first set of examples, Examples 1-4, GS 75 BTX film produced by Aicello Corporation was used as the encasing film. The formulations in Table 1 are for high performance unit dose multi-purpose cleaner concentrate products prior to dilution to 25 to 200 times with water.

TABLE 1

Formulations for Examples 1-4

| Constituent | Type | 1 (wt %) % | 2 (wt %) % | 3 (wt %) % | 4 (wt %) % |
|---|---|---|---|---|---|
| Purified water* | water | — | — | — | 11 |
| n-alkyl dimethyl benzyl ammonium chloride and n-alkyl dimethyl ethylbenzyl ammonium chloride (BTC ® 2125 M-P40-Stepan) | disinfecting agent | — | — | — | 10 |
| Mixture of 1,2-Benzisothiazolin-3-one (2.5% solution) and 2-Methyl-4-isothiazolin-3-one (2.5% solution) (ACTICIDE ® MBS-Thor Specialties) | antimicrobial agent/ preservative | 5 | 5 | 5 | — |

TABLE 1-continued

Formulations for Examples 1-4

| Constituent | Type | 1 (wt %) % | 2 (wt %) % | 3 (wt %) % | 4 (wt %) % |
|---|---|---|---|---|---|
| Tripropylene glycol methyl ether (DOWANOL ™ TPM Glycol Ether-Dow Chemical) | cleaning solvent | 20 | 20 | 20 | 20 |
| 2-Ethyl hexanol Ethylene Oxide-Propylene Oxide Surfactant (ECOSURF ™ EH-9-Dow Chemical) | surfactant | 26 | — | 20 | 19 |
| 2-ethyl hexanol Ethylene Oxide-Propylene Oxide Copolymer (TERGITOL ™ EH 9-Dow Chemical) | surfactant | — | 26 | — | — |
| Alkyl (C8-16) polyglucosides 50% solution (GLUCOPON ® 425-BASF) | surfactant | 10.5 | 10.5 | — | 4 |
| Alkyl (C10-16) polyglucosides (GLUCOPON ® 600 UP-BASF) | surfactant | 3.5 | 3.5 | — | — |
| Sodium laureth sulfate, 70% active (TEXAPON ® N70-BASF) | surfactant | — | — | 20 | — |
| Diisopropanolamine (Dow Chemical) | pH control agent | 10 | 10 | 10 | 10 |
| Tetrasodium N,N-bis(carboxymethyl) L-glutamate (DISSOLVINE ® GL-47-S-Nouryon) | chelant | 5 | 5 | 5 | 1 |
| Dipropylene glycol n-butyl ether (DOWANOL ™ DPnB-Dow Chemical) | cleaning solvent | 20 | 20 | 20 | 25 |
| | | 100 | 100 | 100 | 100 |

*Refers to water separately added and does not include water present in surfactants and other constituents.

Referring to Table 1, the concentrated cleaning composition of Example 4 included a greater concentration of antimicrobial agents compared to Examples 1-3. In particular, the concentrated cleaning composition of Example 4 included 10 wt. % of the disinfectant blend of n-alkyl dimethyl benzyl ammonium chloride and n-alkyl dimethyl ethylbenzyl ammonium chloride compared to only 5 wt. % of a preservative in Examples 1-3. The greater concentrations of antimicrobial agents in the concentrated cleaning composition of Example 4 may enable the concentrated cleaning composition of Example 4 to serve as an example of a formulation intended to be used to prepare a disinfectant composition when diluted 25 to 200 times with water.

For Examples 5-12 in the following Tables 2 and 3, MONOSOL® M8630 PVOH based thermoplastic film having a thickness of 3 mil was used as the encasing film for preparing the unit dose multi-purpose cleaner concentrate products. The concentrated cleaning compositions for the unit dose multi-purpose cleaner concentrate products in Examples 5-12 all included one or more disinfecting agents and are intended to be examples of unit dose multi-purpose cleaner concentrate products that can be used to prepare disinfectant compositions when diluted up to 200 times with water.

TABLE 2

Formulations for Examples 5-8

| Constituent | Type | 5 (wt %) | 6 (wt %) | 7 (wt %) | 8 (wt %) |
|---|---|---|---|---|---|
| Purified water* | | 10.00 | 7.50 | 7.50 | 4.00 |
| Trisodium dicarboxymethyl alaninate, 40% solution (TRILON ® M-BASF) | chelant | — | — | 5.00 | 8.50 |
| Diisopropanolamine 99% (Dow Chemical) | pH control agent | — | 10.00 | 10.00 | 10.00 |
| Proypylene glycol methyl ether (DOWANOL ™ PM-Dow Chemical) | cleaning solvent | 20.00 | 15.00 | 10.00 | — |
| Tripropylene glycol methyl ether (DOWANOL ™ TPM Glycol Ether-Dow Chemical) | cleaning solvent | 20.00 | 15.00 | 15.00 | 10.00 |
| Dipropylene glycol n-butyl ether (DOWANOL ™ DPnB Glycol Ether-Dow Chemical) | cleaning solvent | — | — | — | 20.00 |
| Ethylene glycol monohexyl ether (Hexyl CELLUSOLVE ™ Solvent-Dow Chemical) | cleaning solvent | — | — | — | — |
| Dipropylene glycol n-propyl ether (DOWANOL ™ DPnP-Dow Chemical) | cleaning solvent | — | — | — | — |
| 2-Ethyl hexanol Ethylene Oxide-Propylene Oxide Surfactant (ECOSURF ™ EH-6-Dow Chemical) | surfactant | 30.00 | 30.00 | 30.00 | 25.00 |

TABLE 2-continued

| Formulations for Examples 5-8 | | | | | |
|---|---|---|---|---|---|
| Constituent | Type | 5 (wt %) | 6 (wt %) | 7 (wt %) | 8 (wt %) |
| Secondary alcohol ethoxylate (TERGITOL ™ 15-S-7-Dow Chemical) | surfactant | 10.00 | 10.00 | 10.00 | — |
| Caprylyl/decyl polyglucoside-70% (GLUCOPON ® 225 DK-BASF) | surfactant | — | — | — | 10.00 |
| di-n-decyldemethylammonium chloride 80% solution (ACTICIDE DDQ 80-Thor Specialties) | disinfecting agent | 10.00 | 12.50 | — | — |
| 50% n-alkyl (60% C14, 30% C16, 5% C12, 5% C18) dimethylbenzl ammonium chloride/50% n-alkyl (68% C12, 32% C14) dimethylethylbenzyl ammonium chloride-80% solution (MAQUAT ® MQ2525M-80-Pilot Chemical) | disinfecting agent | — | — | 12.50 | 12.50 |
| n-alkyl (50% C14, 40% C12, 10% C16) dimethyl benzyl ammonium chloride (MAQUAT ® MC1412-80E-Pilot Chemical) | disinfecting agent | — | — | — | — |
| Fragrance-Sozio Lavander SZUS011051 (components registered with EPA) | fragrance | — | — | — | — |
| Fragrance-Sozio SZ42642 Orange (components registered with EPA) | fragrance | — | — | — | — |
| Total | | 100.00 | 100.00 | 100.00 | 100.00 |

*Refers to water separately added and does not include water present in surfactants and other constituents.

TABLE 3

| Formulations for Examples 9-12 | | | | | |
|---|---|---|---|---|---|
| Constituent | Type | 9 (wt. %) | 10 (wt %) | 11 (wt %) | 12 (wt %) |
| Purified water* | | 4.00 | 4.00 | 4.00 | 4.00 |
| Trisodium dicarboxymethyl alaninate, 40% solution (TRILON ® M-BASF) | chelant | 8.50 | 8.50 | 8.50 | 8.50 |
| Diisopropanolamine 99% (Dow Chemical) | pH control agent | 10.00 | 10.00 | 10.00 | 10.00 |
| Proypylene glycol methyl ether (DOWANOL ™ PM-Dow Chemical) | cleaning solvent | — | — | — | — |
| Tripropylene glycol methyl ether (DOWANOL ™ TPM Glycol Ether-Dow Chemical) | cleaning solvent | 10.00 | — | — | — |
| Dipropylene glycol n-butyl ether (DOWANOL ™ DPnB Glycol Ether-Dow Chemical) | cleaning solvent | 10.00 | 20.00 | 8.50 | 8.50 |
| Ethylene glycol monohexyl ether (Hexyl CELLUSOLVE ™ Solvent-Dow Chemical) | cleaning solvent | 10.00 | 7.00 | — | — |
| Dipropylene glycol n-propyl ether (DOWANOL ™ DPnP-Dow Chemical) | cleaning solvent | — | — | 8.50 | 8.50 |
| 2-Ethyl hexanol Ethylene Oxide-Propylene Oxide Surfactant (ECOSURF ™ EH-6-Dow Chemical) | surfactant | 25.00 | 20.00 | 30.00 | 30.00 |
| Secondary alcohol ethoxylate (TERGITOL ™ 15-S-7-Dow Chemical) | surfactant | — | — | — | — |
| Caprylyl/decyl polyglucoside-70% (GLUCOPON ® 225 DK-BASF) | surfactant | 10.00 | 10.00 | 10.00 | 10.00 |
| di-n-decyldemethylammonium chloride 80% solution (ACTICIDE ® DDQ 80-Thor Specialties) | disinfecting agent | — | — | — | 6.50 |
| 50% n-alkyl (60% C14, 30% C16, 5% C12, 5% C18) dimethylbenzl ammonium chloride/50% n-alkyl (68% C12, 32% C14) dimethylethylbenzyl ammonium chloride-80% solution (MAQUAT ® MQ2525M-80-Pilot Chemical) | disinfecting agent | 12.50 | 12.50 | 12.50 | — |

TABLE 3-continued

| Formulations for Examples 9-12 | | | | | |
|---|---|---|---|---|---|
| Constituent | Type | 9 (wt. %) | 10 (wt %) | 11 (wt %) | 12 (wt %) |
| n-alkyl (50% C14, 40% C12, 10% C16) dimethyl benzyl ammonium chloride (MAQUAT ® MC1412-80E-Pilot Chemical) | disinfecting agent | — | — | — | 6.00 |
| Fragrance-Sozio Lavander SZUS011051 (components registered with EPA) | fragrance | — | 8.00 | — | — |
| Fragrance-Sozio SZ42642 Orange (components registered with EPA) | fragrance | — | — | 8.00 | 8.00 |
| Constituent | | 100.00 | 100.00 | 100.00 | 100.00 |

*Refers to water separately added and does not include water present in surfactants and other constituents.

In some embodiments, other blends of disinfecting agents can be considered, at sufficiently high concentration to create upon dilution by a factor of 25-200 times with water, an effective disinfectant cleaning solution, such as, but not limited to, blends of n-alkyl dimethyl benzyl ammonium chloride, di-n-octyl dimethyl ammonium chloride, n-octyl decyl dimethyl ammonium chloride, di-n-decyl dimethyl ammonium chloride, and other aforementioned disinfectants.

As used herein, the singular forms "a," "an" and "the" include plural referents unless the context clearly dictates otherwise. Thus, for example, reference to "a" component includes aspects having two or more such components, unless the context clearly indicates otherwise.

It should be understood that any two quantitative values assigned to a property may constitute a range of that property, and all combinations of ranges formed from all stated quantitative values of a given property are contemplated in this disclosure. It should be appreciated that compositional ranges of a chemical constituent in a composition or formulation should be appreciated as containing, in some embodiments, a mixture of isomers of that constituent. It should be appreciated that the examples supply compositional ranges for various compositions, and that the total amount of isomers of a particular chemical composition can constitute a range.

Further, it should be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A unit dose multi-purpose cleaner concentrate product, consisting of:

from 4 grams to 50 grams in mass of a concentrated cleaning composition encased in a water soluble film, wherein the concentrated cleaning composition is a liquid and consists of:

from 5 wt. % to 80 wt. % of at least one cleaning solvent having a molecular weight greater than 61 grams per mole, wherein the at least one cleaning solvent comprises at least one glycol ether solvent selected from the group consisting of dipropylene glycol n-propyl ether, dipropylene glycol n-butyl ether, propylene glycol n-butyl ether, propylene glycol n-propyl ether, tripropylene glycol n-butyl ether, propylene glycol phenyl ether, dipropylene glycol phenyl ether, propylene glycol methyl ether, propylene glycol methyl ether acetate, dipropylene glycol methyl ether, dipropylene glycol methyl ether acetate, tripropylene glycol methyl ether, ethylene glycol hexyl ether, diethylene glycol hexyl ether, ethylene glycol propyl ether, diethylene glycol phenyl ether, ethylene glycol phenyl ether, poly (oxy-1, 2-ethanediyl), alpha-phenyl-omega-hydroxy, diethylene glycol ethyl ether, diethylene glycol n-butyl ether, ethylene glycol n-butyl ether, and any combinations thereof;

from 2 wt. % to 20 wt. % of one or more alkaline compounds, pH control agents, or both, wherein the one or more alkaline compounds, pH control agents, or both provide pH control in the alkaline region;

from 5 wt. % to 80 wt. % of at least one surfactant selected from the group consisting of 2-ethyl hexanol ethylene oxide-propylene oxide; 2-ethyl hexanol ethylene oxide-propylene oxide copolymer; alkyl polyglucosides, wherein the alkyl group comprises from 8 to 16 carbon atoms; sodium laureth sulfate; ethoxylated triglycerides; block co-polymers of ethylene oxide and propylene oxide; alcohol methyl ester ethoxylates; Guerbet alcohol ethoxylates; and any combinations thereof;

from 6 wt. % to 12.5 wt. % of a disinfecting agent comprising at least one quaternary ammonium compound, wherein the at least one quaternary ammonium compound is selected from the group consisting of n-alkyl dimethyl benzyl ammonium chloride, n-alkyl dimethyl ethylbenzyl ammonium chloride, alkyl dimethyl benzyl ammonium chlorides having alkyl carbon chains between C8 and C18, didecyl dimethyl ammonium chloride, dioctyl dimethyl ammonium chloride, n-octyl decyl dimethyl ammonium chloride, alkyl dimethyl ethyl benzyl ammonium chloride, alkyl dimethyl benzyl ammonium saccharinate, and combinations thereof;

from 0.1 wt. % to 12.5 wt. % of an antimicrobial agent different from the disinfecting agent, wherein the antimicrobial agent is selected from the group consisting of methylchloroisothiazolinone, methylisothiazolinone, benzisothiazolinone, benzalkonium chloride, benzethonium chloride, benzoic acid, sodium benzoate, benzyl alcohol, chloroxylenol, salicylic acid or its metal salt form, sorbic acid or its metal salt form, and combinations thereof;

less than or equal to 20 wt. % water; and optionally, one or more additives selected from the group consisting of:

a chelant selected from the group consisting of N,N-bis(carboxymethyl) glutamic acid, methylglycine diacetic acid, ethylene diamine tetraacetic acid, iminodisuccinic acid, sodium citrate, sodium citrate dehydrate, ethylenediamine-N,N'-disuccinic acid, and any combinations thereof;

a dispersive polymer selected from the group consisting of acrylate polymers, acrylic/maleic copolymers, copolymers of carboxylic acid and sulfonic acid, polymers of itaconic acid monomers, sulfonic acid, and/or sulfonated styrene monomers, and any combinations thereof;

a dual functional solvent different from the at least one cleaning solvent, wherein the dual functional solvent is N-alkyl-2-pyrrolidones;

a surface modification additive comprising at least one polymer selected from the group consisting of copolymers of ethylenically-unsaturated dicarboxylic acid anhydride or partial ester thereof with an ethylenically-unsaturated monomer that has no carboxyl groups, styrene/maleic anhydride copolymers, polyoxyethylene glycols, polyvinyl alcohols, and any combinations thereof;

a hydrotrope selected from the group consisting of sodium xylene sulfonate, sodium cumene sulfonate, sodium n-octyl sulfate, and any combinations thereof;

a solubilizer selected from the group consisting of propylene glycol, dipropylene glycol, glycerine, and any combinations thereof;

enzymes selected from the group consisting of proteases, amylases, lipases, and any combinations thereof;

thickeners selected from the group consisting of cross-linked polyarcylates, amide polymers, xanthan gum, and any combinations thereof;

colorants;

fragrances; and combinations thereof;

wherein a total weight percentage of the at least one cleaning solvent and the at least one surfactant, expressed on an anhydrous basis, is at least 50% of the weight of the unit dose multi-purpose cleaner concentrate product.

2. The unit dose multi-purpose cleaner concentrate product of claim 1, wherein the concentrated cleaning composition comprises the chelant.

3. The unit dose multi-purpose cleaner concentrate product of claim 1, wherein the disinfecting agent is present in an amount sufficient to provide disinfecting capabilities to a diluted multi-purpose cleaning composition prepared by diluting the unit dose multi-purpose cleaner concentrate product by a dilution factor of from 25 to 200 times.

4. The unit dose multi-purpose cleaner concentrate product of claim 1, wherein the concentrated cleaning composition comprises the pH control agent and the pH control agent is selected from the group consisting of monoisopropanolamine, diisopropanolamine, and combinations thereof.

5. The unit dose multi-purpose cleaner concentrate product of claim 1, wherein the concentrated cleaning composition comprises the dispersive polymers operable to provide dispersive cleaning, water hardness control, or both.

6. The unit dose multi-purpose cleaner concentrate product of claim 1, wherein the concentrated cleaning composition comprises the surface modification additives operable to provide improved antifogging, surface wetting, or both.

7. The unit dose multi-purpose cleaner concentrate product of claim 1, wherein the concentrated cleaning composition comprises the dual functional solvent, wherein the dual functional solvent is N-alkyl-2-pyrrolidones.

8. The unit dose multi-purpose cleaner concentrate product of claim 1, wherein the concentrated cleaning composition comprises the enzymes.

9. The unit dose multi-purpose cleaner concentrate product of claim 1, wherein the concentrated cleaning composition comprises the colorants, the fragrances, or combinations of these.

10. The unit dose multi-purpose cleaner concentrate product of claim 1, wherein the concentrated cleaning composition comprises the thickener.

11. The unit dose multi-purpose cleaner concentrate product of claim 1, wherein the concentrated cleaning composition comprises:

from 0 wt. % to 40 wt. % of the chelants;

from 0 wt. % to 20 wt. % of the dispersive polymers;

from 0 wt. % to 20 wt. % of the dual functional solvent, where the dual functional solvent is N-alkyl-2-pyrrolidones;

from 0 wt. % to 20 wt. % of the surface modification additives;

from 0 wt. % to 30 wt. % of the hydrotropes, the solubilizers, or combinations thereof;

one or more of the enzymes;

one or more of the thickeners; and one or more of the colorants, fragrances, or both.

12. A dilute multi-purpose cleaning solution prepared from the unit dose multipurpose cleaner concentrate product according to claim 1, wherein the dilute multi-purpose cleaning solution is prepared by diluting the unit dose multi-purpose cleaner concentrate product with water at a dilution factor of from 25 to 200.

13. A method of cleaning a surface, the method comprising: (1) inserting the unit dose multi-purpose cleaner concentrate product according to claim 1 into a vessel; (2) adding water to the vessel; (3) mixing the water and the unit dose multi-purpose cleaner concentrate product in the vessel, wherein the mixing causes the water soluble film of the unit dose multi-purpose cleaner concentrate product to dissolve and the concentrated cleaning composition to mix with the water to form a dilute cleaning solution; and (4) applying the dilute cleaning solution to a surface.

* * * * *